United States Patent Office 2,774,795
Patented Dec. 18, 1956

2,774,795
METHOD OF DECOMPOSING LIGNIN AND LIGNIN-CONTAINING MATERIALS

Johann Giesen, Haldenstein, Chur, Graubunden, Switzerland, assignor to Inventa A.-G., für Forschung und Patentverwertung Luzern, Lucerne, Switzerland No Drawing. Application March 3, 1953,
Serial No. 340,135

Claims priority, application Switzerland March 5, 1952

6 Claims. (Cl. 260—619)

This invention relates to the subject of decomposing lignin (and materials containing it) and involves a novel method therefor. Such decomposition of lignin and lignin-containing materials by pressure hydrogenation with hydrogen at elevated temperatures, and with elevated pressures up to about 500 atmospheres, and in the presence of a suitable catalyst, has been generally known and described. The reaction products obtained, in addition to distillable hydro-aromatic and phenolic substances, comprise more or less high molecular nondistillable products.

The technical value of a lignin decomposition method, generally speaking, is dependent, on the one hand, on the total yield of distillable hydrogenation products, especially phenols, and on the other hand is dependent on a high content of substances of low boiling point. Bearing in mind these considerations, the factors affording the present improvement are referred to.

Thus, it has now been found by research and experiment that when working with oxidic catalysts, in the presence of water, the total yield of phenolic products increases progressively with increasing temperature, but also that the percentage content of substances of low boiling point decreases. A further factor noted is that a determined upper temperature limit must not be exceeded in view of the fact that thermal decomposition of the lignin molecule takes place at a temperature above about 380° C.

During the research leading to the present invention it was unexpectedly found and determined that the disadvantageous effect referred to of an increase of temperature can be obviated by working the process at a pressure of about from 500 to 1000 atmospheres, preferably 700 of the order of atmospheres; in which case, in addition to an increase in the total yield of phenolic reaction products, a higher percentage of phenols of low boiling point is also obtained. It could not be foreseen, but was a surprising discovery, that, in spite of the high hydrogen pressure and the relatively low temperature, no hydrogenation of the aromatic nucleus would occur.

Working at the aforesaid pressure of the order of 500 to 1000 atmospheres affords the additional advantage that the period of reaction can be reduced from about 7 to 8 hours to about 2 to 3 hours, which is particularly important if the process is to be carried out as a continuous one rather than a batch by batch process having lower production but otherwise available.

*Example 1*

The following specific examples particularize on certain characteristics sometimes of practical value.

In this first instance, 600 g. Scholler lignin, having a water content of 37.3 percent, together with 1600 cc. of water and 120 g. of copper-oxide-chromium-oxide are heated in a five-liter autoclave (equipped with a stirrer) at 300° C. for 2 hours under hydrogen pressure of 700 atmospheres.

The tarry product, which is largely deposited upon cooling, in addition to part in an aqueous phase, is freed from admixed catalyst by dissolving in acetone and then filtering or centrifuging, the solvent being then driven off by distillation. 130 g. of distillate are thus obtained, and by extraction of the aqueous phase, with ether, there are also obtained 32 g. of miscellaneous fractions boiling above 100° C. Of these fractions 162 g., equal to 43 percent of the dry lignin, 51.5 percent equal to 22 percent calculated on the lignin distilled over at a temperature up to 275° C., at normal pressure. 75 percent of the total distillate is of a phenolic nature.

*Example 2*

In this case, 600 g. lignin with a water content of 38.0 percent, together with 1600 cc. water and 120 g. of copper-chromium-oxide catalyst, are hydrogenated for 3 hours at 300° C. at a pressure of 700 atmospheres in a five-liter autoclave with a stirrer.

After working up the product as described in Example 1, 41 percent of distillable reaction products are obtained, of which 73 percent, that is 29 percent of the lignin, distill at temperatures up to 275° C. at normal pressure.

In one aspect the general process described consists in treating the lignin material by hydrogenation and hydrolysis at elevated temperature and pressure, and by the action of an oxidic catalyst; preferably the catalyst containing a chromium oxide; and the reaction pressure being preferably between 500 and 1000 atmospheres.

What is claimed is:

1. A process of decomposing lignin and lignin-containing material which comprises subjecting an aqueous suspension of the lignin-containing material to a hydrogen pressure of 500–1000 atmospheres at a temperature of about 300° C. in the presence of copper oxide-chromium oxide as a hydrogenating catalyst to effect hydrogenation and hydrolysis and to produce phenol products.

2. The process as defined in claim 1, wherein the hydrogen pressure is in the order of 700 atmospheres.

3. The process as defined in claim 1, wherein the hydrogen pressure is in the order of 700 atmospheres, and the lignin decomposing process is continued from about 2 to 3 hours.

4. The process as defined in claim 1, wherein the water contents of the lignin suspension is about 38%.

5. The process as defined in claim 1, wherein a tarry product is produced by the decomposition of the lignin-containing material and wherein the process is continued by dissolving the tarry product in a solvent, separating the catalyst from the solution, distilling off the solvent and subjecting the distillate to extraction to obtain the desired decomposed lignin.

6. The process as defined in claim 1, wherein the lignin-containing material is a Scholler lignin.

References Cited in the file of this patent
UNITED STATES PATENTS

| | | |
|---|---|---|
| 2,146,655 | Sherrard et al. | Feb. 7, 1939 |
| 2,331,154 | Adkins | Oct. 5, 1943 |
| 2,390,063 | Freudenberg et al. | Dec. 4, 1945 |